(12) United States Patent
Decker

(10) Patent No.: US 9,927,321 B2
(45) Date of Patent: Mar. 27, 2018

(54) FILM CHAMBER AND METHOD FOR LEAK DETECTION ON A NON-RIGID SPECIMEN

(71) Applicant: Inficon GmbH, Köln (DE)

(72) Inventor: Silvio Decker, Köln (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 14/432,359

(22) PCT Filed: Sep. 26, 2013

(86) PCT No.: PCT/EP2013/070101
§ 371 (c)(1),
(2) Date: Mar. 30, 2015

(87) PCT Pub. No.: WO2014/053393
PCT Pub. Date: Apr. 10, 2014

(65) Prior Publication Data
US 2015/0241298 A1    Aug. 27, 2015

(30) Foreign Application Priority Data

Oct. 1, 2012    (DE) .................. 10 2012 217 945

(51) Int. Cl.
*G01M 3/04*    (2006.01)
*G01M 3/26*    (2006.01)
*G01M 3/32*    (2006.01)

(52) U.S. Cl.
CPC ............ *G01M 3/26* (2013.01); *G01M 3/3218* (2013.01); *G01M 3/3281* (2013.01)

(58) Field of Classification Search
CPC .... G01M 3/26; G01M 3/3218; G01M 3/3281; G01M 3/329; G01M 3/36; G01M 3/363;
(Continued)

(56) References Cited

U.S. PATENT DOCUMENTS 4,593,554 A    6/1986  Aarts
5,513,516 A *  5/1996  Stauffer ............... G01M 3/329
                                                        73/49.2
(Continued)

FOREIGN PATENT DOCUMENTS

EP    0 152 981    8/1985
EP    0 450 688    10/1991
(Continued)

OTHER PUBLICATIONS

English Translation (JP S60-227144 A), Aarts, Product Suppliers AG, pp. 1-17.*
(Continued)

*Primary Examiner* — John Fitzgerald
*Assistant Examiner* — Truong D Phan
(74) *Attorney, Agent, or Firm* — Brinks Gilson & Lione; G. Peter Nichols

(57) ABSTRACT

The invention relates to a method for determining the rate of leakage on a non-rigid specimen, wherein the specimen is introduced to a film chamber which can be evacuated, having at least one wall region made of a flexible material and the pressure in the film chamber is reduced outside of the specimen. The pressure gradient within the film chamber outside of the specimen is measured. In order to increase the accuracy of the leak detection, an outer over-pressure is exerted on the flexible wall region during pressure measurement which exceeds the pressure in the film chamber and outside of the specimen and the pressure inside the specimen.

7 Claims, 2 Drawing Sheets

(58) Field of Classification Search
CPC .... G01M 3/3245; G01M 3/3236; G01M 3/32; G01M 3/04; G01M 3/24; G01M 3/3272
USPC .................................. 73/49.3, 49.2, 40, 52
See application file for complete search history.

(56) References Cited

U.S. PATENT DOCUMENTS

| | | | |
|---|---|---|---|
| 6,167,751 B1* | 1/2001 | Fraim | G01M 3/363 |
| | | | 73/49.3 |
| 2003/0126912 A1* | 7/2003 | Cook | A61H 9/0078 |
| | | | 73/49.2 |
| 2007/0220965 A1* | 9/2007 | Walraet | B60C 23/0476 |
| | | | 73/146.2 |

FOREIGN PATENT DOCUMENTS

| | | |
|---|---|---|
| EP | 0 741 288 | 8/2002 |
| JP | S60-227144 A | 11/1985 |
| JP | S 62112027 | 5/1987 |
| JP | H04-013943 A | 1/1992 |
| JP | H05-215588 A | 8/1993 |
| JP | H10-185752 A | 7/1998 |
| JP | 2000-046685 A | 2/2000 |

OTHER PUBLICATIONS

PCT/EP2013/070101 International Search Report dated Apr. 10, 2014, (4 pages including English translation).
English language translation of Office Action and Search Report in corresponding Japanese Application No. 2015-533586, dated Apr. 12, 2017, 13 pages.

* cited by examiner

FILM CHAMBER AND METHOD FOR LEAK DETECTION ON A NON-RIGID SPECIMEN

This application claims priority to International Application No. PCT/EP2013/070101 filed Sep. 26, 2013 and to German Application No. 10 2012 217 945.3 filed Oct. 1, 2012; the entire contents of each are incorporated herein by reference.

BACKGROUND

The invention relates to a film chamber and a method for detecting a leak on a non-rigid specimen, for example a food package. Non-rigid specimens have a flexible structure which yields upon variations in pressure. When the pressure differences between the inner pressure of the specimen and the ambient pressure are too great, there is a risk that the specimen ruptures or is at least damaged.

SUMMARY

Conventionally, non-rigid specimens are filled with a test gas and the test gas is measured in the exhaust gas flow of the pump system used to create the pressure differences required. As an alternative, the use of a specific test gas can be omitted, if the sensor is adapted to the filling gas inside the specimen. In this measuring method, influences of the ambient gas can compromise the measuring result.

It is known to use film chambers as test chambers in leak detection, wherein at least one wall region, and preferably the entire test chamber, is made of a flexible, preferably elastically deformable material such as a film, for example. The flexible wall region is formed in the region of the chamber in which the specimen is located during the measurement of the leakage. When the pressure in the chamber is reduced, the flexible chamber wall clings to the specimen, whereby the chamber volume is reduced. Thereby, disturbing influences such as, for example, pressure changes caused by temperature variations, are reduced. Further, the clinging flexible wall region supports the specimen and prevents a deformation or even bursting of the specimen. This is advantageous in particular with specimens of a soft material having a less than stable shape, for example packages. Such film test chambers are described for example in JP-A62-112027, EP 0 152 981 A1 and EP 0 741 288 B1.

In leak detection by means of evacuated film chambers, the pressure increase in the chamber is not influenced exclusively by a leak on the specimen. Rather, the pressure in the film chamber rises in the region outside the specimen also due to desorption of gas that is released from the material of the specimen or of the film chamber. Further, the pressure rise can be influenced virtually by a pressure compensation inside the film chamber.

These additional parameters that influence the pressure rise affect the measurement and have to be taken into account as measuring errors.

It is an object of the invention to provide a precise method for leak detection on a non-rigid specimen, as well as to provide a corresponding device.

The method of the present invention is defined in claim 1. The device of the present invention is defined in claim 5.

According to the invention, an external overpressure is applied at least to the flexible wall region of the film chamber during the pressure measurement, the overpressure exceeding the pressure in the film chamber in the region outside the specimen and the pressure inside the specimen. For this purpose, a pressurizing device is provided for generating the external pressure on the wall region.

The external pressure causes a compression of the soft specimen, whereby the pressure in the specimen changes. Here, the leakage rate is proportional to the square of the pressure difference between the film chamber and the specimen. However, the desorption is not influenced by the external pressure.

Preferably, the film chamber is pressurized periodically, i.e. the pressure is increased up to a predefined threshold value and is thereafter lowered again, with the increasing and the subsequent lowering of the pressure being repeated periodically. Thereby, also the pressure inside the specimen changes periodically, as does the leakage rate of the specimen, so that also the pressure rise in the film chamber is superimposed with a periodic part. This periodic part is independent of the desorption and can be used as a measure of the leakage rate of the specimen.

In this regard, the amplitude and/or the phase of the development of the periodic pressure increase occurring can be evaluated. The phase shift between the periodic signal of the pressure exerted on the film chamber from outside and the periodic part of the pressure increase inside the film chamber can be used as the phase. The periodic pressure increase primarily influences the leakage rate of the specimen and influences the disturbing desorption of gases to a much lesser extent or not at all, so that the leakage rate of the specimen can be separated from the virtual leaks.

The application of external pressure on the flexible wall region can be performed pneumatically or hydraulically by means of a fluid pressure chamber. Here, the film chamber can be included in a fluid pressure chamber. As an alternative or in addition, mechanical pressure may be exerted at least on a flexible wall region of the film chamber. The mechanical pressure can be generated by means of a die, for example by means of a die acting on the film chamber from two opposite sides.

The following is a detailed description of embodiments of the present invention with reference to the Figures. In the Figures:

DETAILED DESCRIPTION

Figure 1:
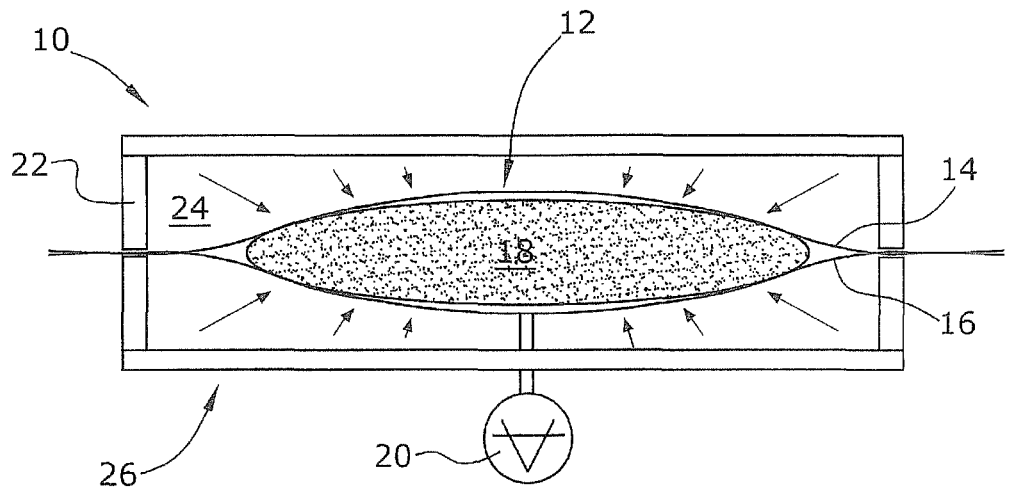
FIG. 1 shows an embodiment using pneumatic overpressure.
Figure 2:
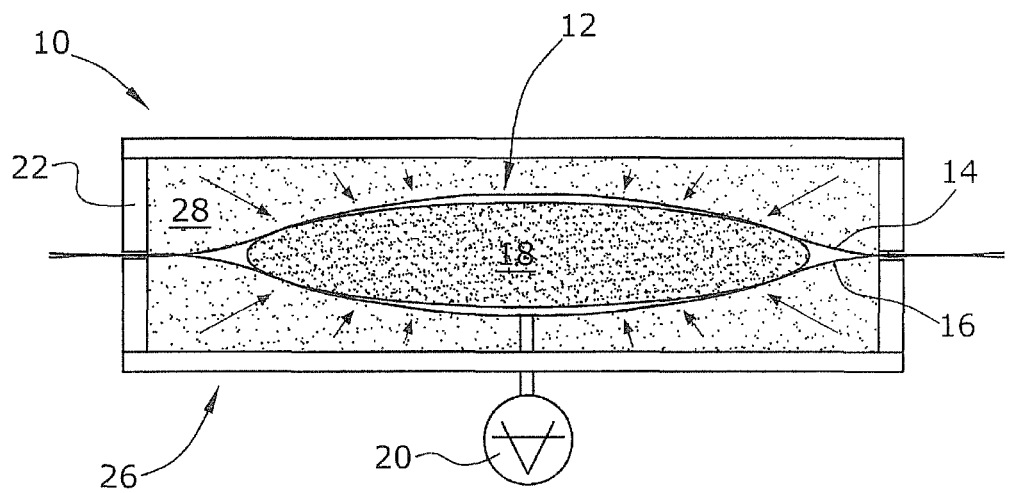
FIG. 2 shows an embodiment using hydraulic pressure.
Figure 3:
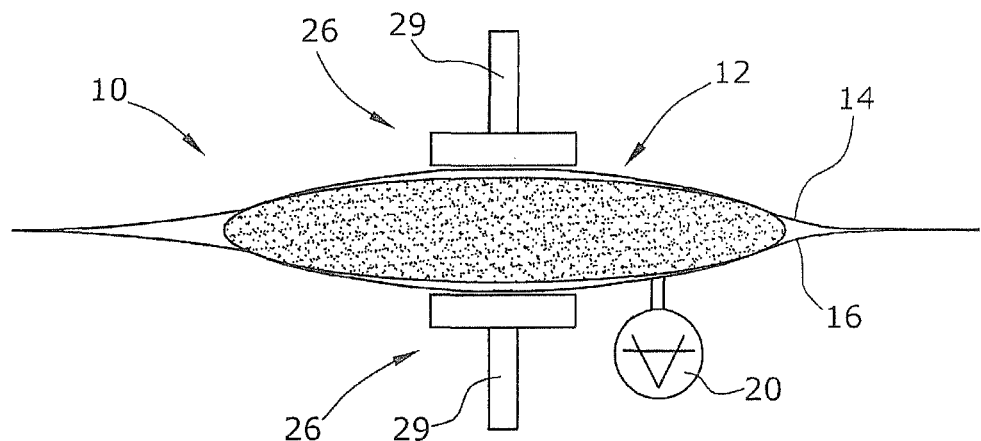
FIG. 3 shows an embodiment using mechanical pressure.

In the embodiments of FIGS. 1-3, the film chamber 12 is formed, respectively, of two films 14, 16 that are placed one upon the other in their edge zones and are fixedly welded or glued to each other. The specimen 18 is contained inside the film chamber 12, which specimen may typically be a flexible non-rigid food package. For simplification of the illustration, the specimen 18 is illustrated with an oval shape.

After the specimen 18 has been introduced into the film chamber 12, the film chamber is evacuated and a manometer 20 is used to detect the pressure profile in the film chamber 12 in the region outside the specimen 18.

In the embodiment shown in FIG. 1 the film chamber 12 is contained in a fluid pressure chamber 22 that is periodically filled with a gas, the gas thereafter escaping from the pressure chamber 22 when a predefined threshold value is reached. This increase and subsequent decrease of the pressure in the pressure chamber 22 outside the film chamber 12 is periodically repeated. The arrows in FIG. 1 indicate the pneumatic pressure occurring that acts on the film chamber 12 in a uniform, homogeneous manner from all sides.

The embodiment shown in FIG. 2 differs from the embodiment shown in FIG. 1 in that the pressurizing device 26 is a fluid chamber 22 filled with a liquid 28. In the embodiment illustrated in FIG. 2 the occurring hydraulic pressure is also periodically increased and lowered, while the pressure in the film camber 12 is measured.

In the embodiment shown in FIG. 3 the pressurizing device 26 comprises two dies 29 that press against the film chamber 12 from opposite sides. Here, the arrows in FIG. 3 indicate the periodic pressure increase and the respective subsequent pressure decrease of the mechanical pressure exerted by the dies 29 on the film chamber 12.

Figure 4:
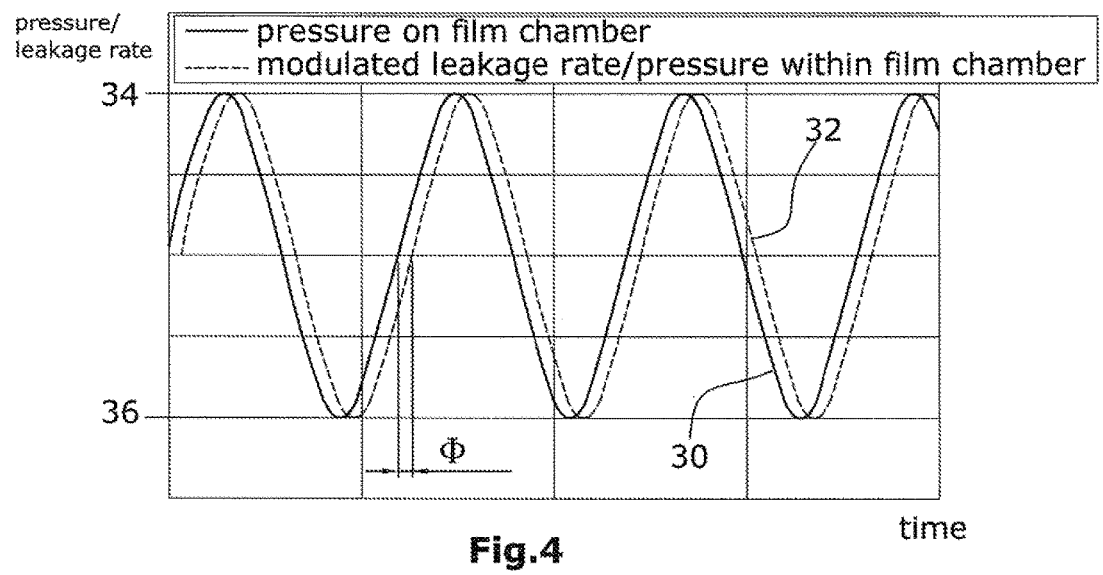
FIG. 4 illustrates the course of the external overpressure over time.

FIG. 4 illustrates both the temporal periodic development 30 of the overpressure exerted by the pressurizing device 26 and acting on the film chamber 12 and the specimen 18. In each period, the external overpressure is increased up to an upper threshold value 34 and is subsequently lowered to a lower threshold value 36. Here, a pressure profile 32 occurs in the film chamber 12 in the region outside the specimen 18, the pressure profile following the periodic changes in the external overpressure. The pressure profile 32 follows the development 30 of the external overpressure with a phase shift φ. Both the amplitude of the pressure profile 32, which is obtained from the threshold values 34, 36, and the phase shift φ thereof can be used to determine the leakage rate of the specimen.

Figure 5:
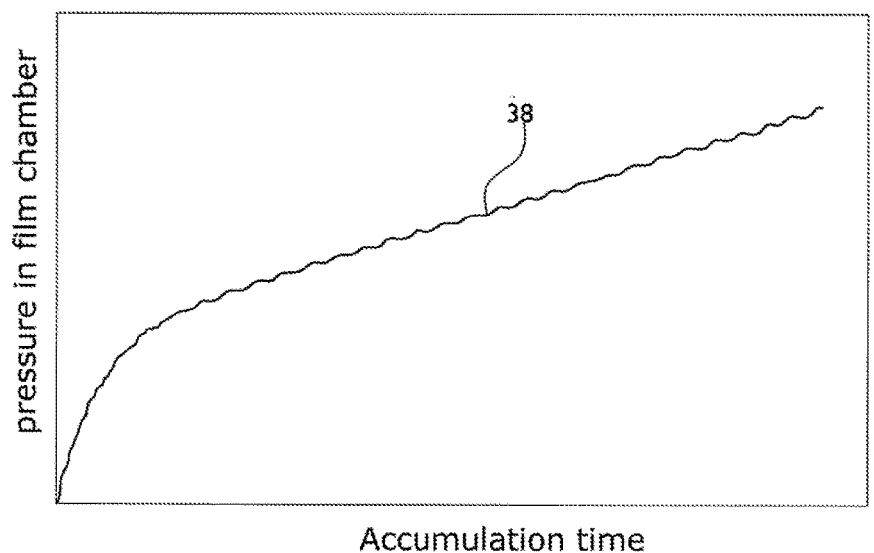
FIG. 5 illustrates the occurring development of the pressure increase in the film chamber.

In FIG. 5 the temporal pressure profile 38 in the film chamber 12 is illustrated. The pressure profile 38 rises over time, due to a leak en in the specimen 18. Because of the periodic pressurization of the film chamber 12 from outside, the pressure increase shows a superposed periodic signal that corresponds to the signal development illustrated in FIG. 4.

The invention claimed is:

1. A method for determining the leakage rate on a non-rigid specimen, comprising:
   introducing the specimen into an evacuable film chamber which has at least one wall region made of a flexible material;
   lowering the pressure in the film chamber outside of the specimen; and,
   measuring a profile of pressure within the film chamber outside of the specimen over a period of time to determine a leakage rate of the specimen,
   wherein an outer overpressure is exerted at least on an outer portion of the flexible wall region of the film chamber during said pressure measurement repeatedly periodically until a peak value is reached, with the overpressure being subsequently released, wherein said overpressure exceeds the pressure in the film chamber and outside of the specimen and the pressure inside the specimen, such that the leakage rate of the specimen and a resulting pressure increase in the film chamber is superimposed with a periodic part that is independent of desorption of gas which is released from the material of the specimen or the film chamber.

2. The method of claim 1, wherein the overpressure on the wall region is generated pneumatically or hydraulically.

3. The method of claim 1, wherein the overpressure on the wall region is generated in a mechanical manner.

4. The method of claim 1, wherein for the determination of the leakage rate, an amplitude and/or a phase of the occurring periodic profile of the pressure increase are evaluated.

5. A device configured to detect a leak on a non-rigid specimen comprising:
   an evacuable film chamber with at least one wall region of a flexible material; and
   a device configured to measure over time a profile of pressure in the film chamber outside the specimen, wherein a pressurizing device is provided to generate an external pressure acting at least on an outer portion of the flexible wall region of the film chamber repeatedly periodically until a peak value is reached, with the external pressure being subsequently released, such that the leakage rate of the specimen and a resulting pressure increase in the film chamber is superimposed with a periodic part that is independent of desorption of gas which is released from the material of the specimen or the film chamber.

6. The device of claim 5, wherein the pressurizing device is a pressure chamber for generating a pneumatic or hydraulic overpressure and the chamber surrounds the film chamber at least in the region of the flexible wall and is adapted to be filled with a fluid.

7. The device of claim 5, wherein the pressurizing chamber is a device for generating mechanical pressure at least on the flexible wall region.

* * * * *